United States Patent

Satzler

[11] Patent Number: 5,857,532
[45] Date of Patent: Jan. 12, 1999

[54] DIFFERENTIAL STEER SYSTEM FOR A MACHINE

[75] Inventor: Ronald L. Satzler, Princeville, Ill.

[73] Assignee: Caterpillar Inc., Peoria, Ill.

[21] Appl. No.: 757,201

[22] Filed: Nov. 27, 1996

[51] Int. Cl.$^6$ ................................................. B62D 6/00
[52] U.S. Cl. ........................... 180/6.2; 180/9.44; 475/19; 475/27
[58] Field of Search ........................ 180/6.2, 6.44, 180/6.48, 6.7, 9.44; 475/18, 27, 19, 23, 28, 29; 364/424.051

[56] References Cited

U.S. PATENT DOCUMENTS

| | | | |
|---|---|---|---|
| 4,023,637 | 5/1977 | Jackovich | 180/6.48 |
| 4,399,886 | 8/1983 | Pollman | 180/6.48 X |
| 4,699,021 | 10/1987 | Waddington | 180/6.44 X |
| 4,700,794 | 10/1987 | Bernhagen et al. | 180/6.44 |
| 4,949,823 | 8/1990 | Coutant et al. | 192/4 |
| 4,998,591 | 3/1991 | Zaunberger | 180/9.44 X |
| 5,325,933 | 7/1994 | Matsushita | 180/6.7 |
| 5,415,596 | 5/1995 | Zulu | 475/27 |
| 5,569,109 | 10/1996 | Okada | 180/6.2 X |
| 5,611,405 | 3/1997 | Ishino et al. | 180/6.2 X |

*Primary Examiner*—Robert J. Oberleitner
*Assistant Examiner*—Pamela J. Lipka
*Attorney, Agent, or Firm*—J. W. Burrows; Kevin M. Kercher

[57] ABSTRACT

A differential steer is provided for use in a machine and includes a variable displacement motor operatively connected to a differential disposed between first and second output members. The variable displacement motor is an over-center type and the displacement thereof is varied from zero to maximum in both directions of movement. Pressurized fluid to drive the steer motor is received from the main system pump. A microprocessor senses the direction and rate of rotation of the steer motor output, the speed of the outputs from the differential, the magnitude of a steer input, and controls the output speed of the steer motor to the differential in response to the magnitude of the steer input. Consequently, the quantity of fluid taken from the main system pump is limited to only that necessary to rotate the steer motor at a rate necessary to satisfy the desired steer input. Since the steer motor is using only the flow necessary to rotate the steer motor output at a desired speed and the steer motor torque is generally proportional to the steer motor displacement, the overall operating efficiency is increased as compared to known differential steer systems.

13 Claims, 2 Drawing Sheets

DIFFERENTIAL STEER SYSTEM FOR A MACHINE

TECHNICAL FIELD

This invention relates generally to a differential steer system for a machine and more particularly to a differential steer system having improved efficiency.

BACKGROUND ART

Differential steer system are well known in the art for use on skid steer machines and track type machines. The differential steer principle is based on providing an input to a differential of a machine that effectively increases the rotation speed of one output shaft and decreases the rotational speed of the other output shaft. The difference in rotational speeds between the respective output shafts causes the machine to turn in the direction of the slowest output speed. The degree of turn is determined by the degree of difference in rotational speed between the respective output shafts. The input to the differential can be increased to a level that results in one of the outputs reaching a zero speed which causes the machine to pivot about the wheel or track that is not turning. Likewise, the input to the differential can be increased to a level that causes one of the outputs to turn in the opposite direction and to a rate equal to the rotational rate of the other output. When one output is rotating in one direction and the other output is rotating in the other direction at the same rate, the machine is negotiating a spot turn.

In the vast majority of the known types of differential steer systems, the input to the differential is provided through a fluid motor. Many of these systems use a dedicated variable displacement pump that is directly connected to the fluid motor in a closed loop manner, commonly referred to as a hydrostatic drive loop. In these systems, the power needed to turn the variable displacement pump, even at zero displacement, takes horsepower from the engine. In machines that do not require frequent steer inputs, the horsepower required to turn the pump is wasted. Consequently, the overall efficiency of the machine is reduced.

In other differential steer systems, the fluid motor is connected to a dedicated pump through a directional control valve. In these systems, the pump is operating at a predetermined pressure level and producing a constant flow rate. When the steer input motor is not being used, the pressurized flow from the pump is being returned to the reservoir across a relief valve or some other type of control valve. Again, the horsepower needed to operate the pump at the predetermined pressure level is wasted. Additionally, in these systems, the flow being returned to the reservoir creates heat which requires extra cooling capacity to keep the oil temperature at an acceptable level. The wasted horsepower and the need for increased cooling capacity decreases the overall operating efficiency of the machine.

In other systems, the pressurized fluid needed to operate the steer input motor is taken from the main system pump, such as the implement pump in order to eliminate the dedicated pump. However, in these types of systems, it is normally necessary to provide a larger pump in order to meet the combined flow demands of both the implement system and the steer input motor. Larger pumps require more horsepower to drive them. As noted above, larger pumps normally require larger cooling systems to maintain the temperature of the oil at an acceptable level. Consequently, the overall operating efficiency of the machine is decreased.

The present invention is directed to overcoming one or more of the problems as set forth above.

DISCLOSURE OF THE INVENTION

In one aspect of the present invention, a differential steer system is provided and adapted for use in a machine having an engine, a source of pressurized fluid connected to a work system, a differential disposed between first and second outputs, and a steer input mechanism. The differential steer system includes a variable displacement steer motor having a displacement adjustment mechanism and an output shaft connected to the differential. The steer motor is fluidity connected to the source of pressurized fluid. The displacement adjustment mechanism is movable in opposite directions from a zero displacement position towards a maximum displacement position. A steer motor input control mechanism is connected to the displacement adjustment mechanism and operative in response to the steer input mechanism to control the displacement of the steer motor. A first sensor is associated with the steer input mechanism and operative to sense the direction and degree of rotation of the steer input mechanism. A second sensor is associated with the output shaft of the steer motor and operative to sense the direction of rotation and the speed of rotation of the steer motor output shaft. A microprocessor is provided and operative to receive the sensed signals from the first and second sensors and deliver a control signal to the steer motor input control mechanism to change the displacement of the steer motor in response to the movement of the steer input mechanism.

BEST MODE FOR CARRYING OUT THE INVENTION

Figure 1:
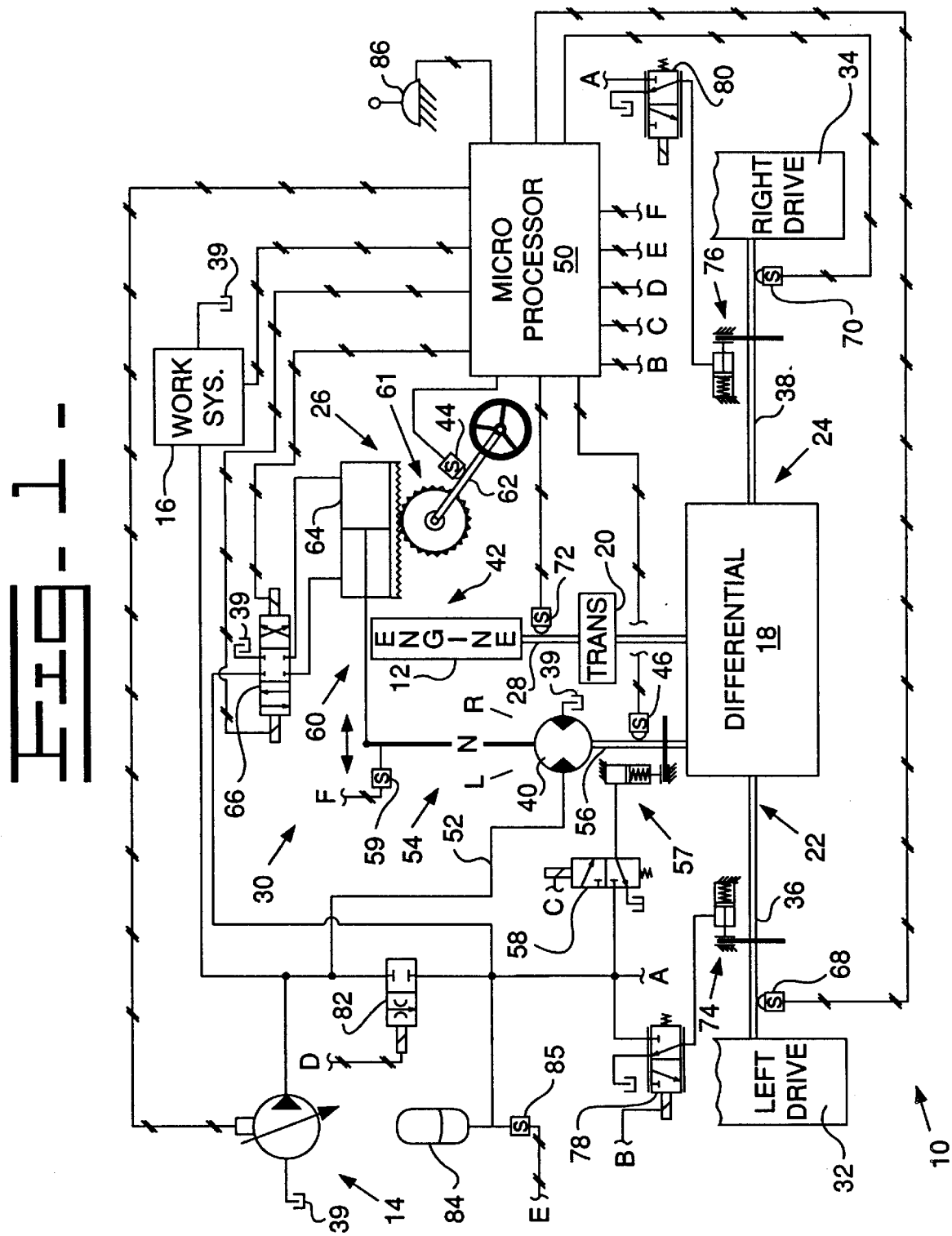
FIG. 1 is a part diagrammatic and a part schematic representation of a differential steer system incorporating the subject invention.

Referring to the drawings and more particularly to FIG. 1, a machine 10 is very generally illustrated. The machine 10 includes an engine 12, a source of pressurized fluid 14, a work system 16 connected to the pump 14, a differential 18 connected to the engine 12 through a transmission 20, first and second outputs 22, 24 extending from the differential 18 and a steer input mechanism 26. A shaft 28 is connected between the engine 12 and the transmission 20. A differential steer system 30 is provided and operative to control the direction of travel of the machine 10 in both the forward and reverse directions. The first and second outputs 22, 24 from the differential 18 is drivingly connected to respective left and right drives 32, 34 by respective output shafts 36, 38. The left and right drives 36, 38 could be in the form of track or wheels.

The source of pressurized fluid 14 could be any type of hydraulic pump and may be either a variable or fixed displacement type. However in the subject arrangement, a variable displacement pump is preferred. It is recognized that the pump has a maximum available flow that is based on the operating speed of the pump and its flow per revolution at its maximum displacement.

The work system 16 includes at least one actuator and associated control valve to control the movement of the actuator. It is recognized that the work system 16 could include more than one actuator and associated control valves. As illustrated the exhaust fluid from the work system 16 is directed to a reservoir 39.

The differential steer system 30 includes a variable displacement steer motor 40, a steer motor input control mechanism 42, first and second sensors 44, 46, and a microprocessor 50. The steer motor 40 is fluidity connected to the pump 14 through a conduit 52 and has a displacement adjustment mechanism 54, and an output shaft 56. A first hydraulically operated brake 57 is connected to the output shaft 56 of the steer motor 40 and operative to selectively restrain the output shaft 56 from rotating. An electrically actuated control valve 58 controls the actuation of the first brake 57. The displacement adjustment mechanism 54 is movable from a zero displacement or neutral position in opposite directions to a maximum displacement position, denoted by "L" and "R" in the drawing. A position sensor 59 is associated with the displacement adjustment mechanism 54 and operative to direct an electrical signal to the microprocessor 50 representative of the position of the displacement adjustment mechanism 54.

The steer motor input control mechanism 42 is connected between the displacement adjustment mechanism 54 and the steer input mechanism 26. The steer motor input control mechanism 42 includes a mechanical mechanism 60. In the subject arrangement, the mechanical mechanism 60 includes a rack and pinion connection 61 between a shaft 62 of the steer input mechanism and the displacement adjustment mechanism 54. A hydraulic actuator 64 is disposed between the rack and pinion connection 61 and the displacement adjustment mechanism 54. The hydraulic actuator 64 is selectively movable to provide an adjustment to the displacement adjustment mechanism 54 in order to compensate for any error between the degree of steer required by the steer input mechanism 26 and the resulting output from the steer motor 40. A solenoid actuated control valve 66 is disposed between the hydraulic actuator 64 and the source of pressurized fluid 14 and operative to control the position of the hydraulic actuator 64.

The first sensor 44 is operative to sense the direction and degree of rotation of the shaft 62 of the steer input mechanism 26. The second sensor 46 is operative to sense the direction of rotation and the speed of rotation of the steer motor output shaft 56.

Third, fourth, and fifth sensors 68, 70, 72 are respectively associated with the first and second output shafts 22, 24 and the engine output shaft 28. The third, fourth and fifth sensors 68, 70, 72 are operative to sense the direction and speed of each of the respective output shafts 22, 24, 28.

Second and third brakes 74, 76 are connected to the respective first and second output shafts 36, 38 and operative to selectively control the rotational speed of the respective output shafts 36, 38. First and second electrically actuated proportional valves 78, 80 are respectively connected between the source of pressurized fluid 14 and the respective second and third brakes 74, 76. The first and second electrically actuated proportional valves 78, 80 and the solenoid actuated control valve 66 are connected to the hydraulic pump 14 downstream of an electrically controlled accumulator charging valve 82.

An accumulator 84 is connected to the hydraulic pump 14 downstream of the accumulator charging valve 82 and operative to supply pressurized fluid to the electrically actuated control valve 58 and the first and second electrically actuated proportional valves 78, 80 in the event the hydraulic pump 14 fails to produce the needed fluid at the desired pressure. A sixth sensor 85 is connected to the accumulator 84 and operative to direct an electrical signal to the microprocessor 50 that is representative of the pressure level in the accumulator 84.

The microprocessor 50 continuously receives the signals from the first, second, third, fourth, and fifth and sixth sensors 44, 46, 68, 70, 72, 85 and the position sensor 59. It is recognized that the sensors 68, 70 could provide the same information that is provided by the sensor 46 since the speed of the output shaft 46 is directly proportional to the difference in speed between the left and right output shafts 36, 38. An operator's command input control 86 directs a signal to the microprocessor 50 to control the work system 16. The microprocessor 50 provides electrical signals to control the operation of the respective electrically actuated control valve 58 and the first and second electrically actuated proportional valves 78, 80. The microprocessor 50 also provides an electrical signal to control the displacement of the hydraulic pump 14. By knowing the speed of the engine 12, the microprocessor 50 controls the displacement of the hydraulic pump 14 to provide the needed flow to the system 16 and the steer motor 40.

Figure 2:
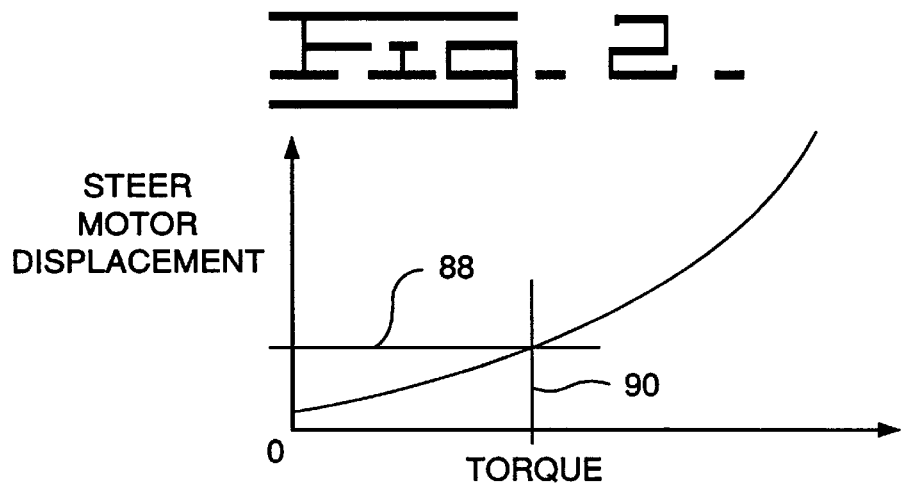
FIG. 2 is a graph representing a typical relationship between the displacement of a steer motor and its output torque.

Referring to FIG. 2, a graph is illustrated and generally represents the relationship, at a given pressure of the hydraulic pump 14, between the displacement of the steer motor 40 and the resulting torque in the output shaft 56. The vertical axis represents the steer motor displacement from zero displacement towards its maximum displacement. The horizontal axis represents the torque output in shaft 56 from zero torque at zero displacement towards increasing torque at increased displacements of the steer motor 40. For example, at a given displacement of the steer motor 40, as represented by the horizontal line 88, a torque is produced in the shaft 56 as represented by the vertical line 90. The differential 18 requires different torque levels in order to rotate the output shaft 56 at various rotational speeds.

Figure 3:
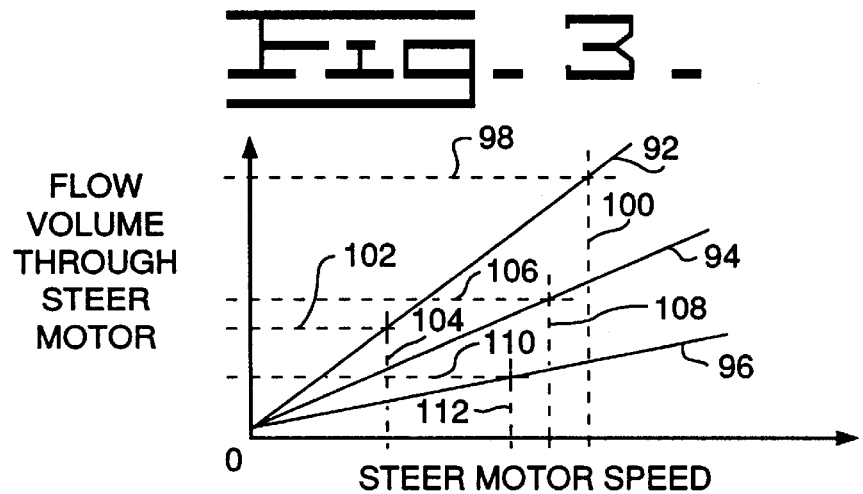
FIG. 3 is a graph representing the relationship between the output speed of the steer motor and the volume of flow being directed across the steer motor.

Referring to FIG. 3, a graph is illustrated and generally represents the relationship between the volume of fluid being directed through the steer motor 40 and the speed of the output shaft 56 of the steer motor 40. The vertical axis represents the volume of flow passing through the steer motor 40 and the horizontal axis represents the resulting speed of the steer motor output shaft 56. Various steer motor displacement positions are illustrated by lines 92, 94, 96. For a given displacement setting of the steer motor 40, a given volume of fluid passes through the steer motor 40, as represented by a horizontal dashed line 98, the resulting speed of the output shaft 56 is represented by a vertical dashed line 100. Likewise, for the same displacement setting and a different volume of fluid, represented by a dashed line 102, results in a slower output speed as represented by a dashed line 104. For a different displacement of the steer motor 40, as represented by the line 94, a flow rate, as represented by a dashed line 106, results in an output speed as represented by a dashed line 108. For yet another displacement of the steer motor 40, as represented by the line 96, a flow rate, as represented by a dashed line 110 results in an output speed as represented by a dashed line 112. It should be recognized that as the displacement setting of the steer motor 40 is decreased, the same flow rate through the steer motor 40 results in a higher output speed for the output shaft 56.

Figure 4:
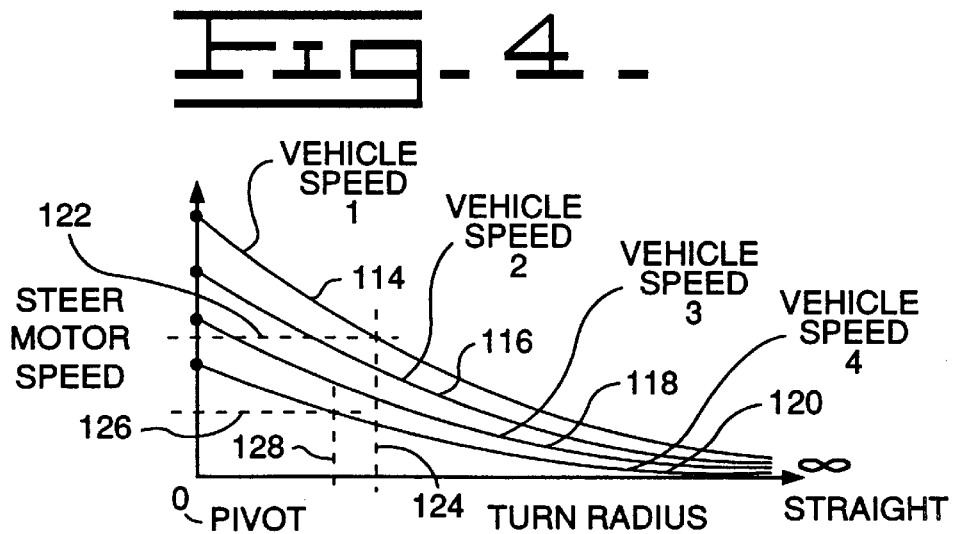
FIG. 4 is a graph representing the relationship between the speed of the steer motor and the turn radius of the machine at various machine speeds.

Referring to FIG. 4, a graph is illustrated and generally sets forth the relationship between the output speed of the steer motor 40 and the turning radius of the machine 10. The vertical axis represents the output speed of the steer motor 40 from zero speed upwards and the horizontal axis represents the turn radius of the machine 10 from a pivot turn at the left end to basically traveling straight at the right end. Various vehicle ground speeds are depicted by respective lines 114, 116, 118, 120. The ground speed depicted by line 114 is the largest and the ground speed depicted by line 120 is the smallest.

When considering a vehicle ground speed as depicted by line 114, a steer motor output speed as indicated by a line 122 results in a turn radius as indicated by a line 124. Likewise, when considering a vehicle ground speed as depicted by line 120, a steer motor output speed as indicated by a line 126 results in a turn radius as indicated by a line 128. As can be readily understood from a review of the graph, if the machine 10 ground speed is slower, the machine 10 can negotiate the same turn radius with a slower motor output speed. From a review of the graph, if for a selected ground speed of the machine 10 the motor output speed is lowered, the machine 10 will turn about a larger turn radius and if the motor output speed is increased, the turn radius is made smaller.

It is recognized that various forms of the subject machine 10 and differential steer system could be utilized without departing from the essence of the subject invention. For example, the steer input control mechanism 42 could be well known automotive type power steering unit wherein a steer input by the operator would be hydraulically transmitted to the displacement adjustment mechanism 54. Likewise, the steer motor 40, the first brake 57 and the output shaft 56 could all be an integral part of the differential and commonly referred to as a differential steer mechanism.

Industrial Applicability

When the subject machine 10 is traveling in a straight line, the microprocessor 50 provides a signal to the control valve 58 to provide pressurized fluid to actuate the first brake 57 thus preventing the output shaft 56 from the steer motor 40 from turning. Since the output shaft 56 is not turning, the differential 18 functions in a well known manner to provide power to the left and right drives 32, 34. If it is desired to steer the machine 10 to the left, the operator makes an input to the steer input mechanism 26. The operator's input is directed through the steer motor input control mechanism 42 to the displacement adjustment mechanism 54 to accordingly change the displacement of the steer motor 40. The first sensor 44 detects the direction and degree of rotation of the shaft 62 and directs a signal representative thereof to the microprocessor 50. The microprocessor 50 directs a signal to the control valve 58 to release the first brake 57. Once the displacement of the steer motor 40 has been made, pressurized fluid from the source of pressurized fluid 14 forces the output shaft 56 to rotate. As illustrated in FIG. 3, a given volume of fluid flowing through the steer motor 40 results in the output shaft 56 turning at a predetermined velocity. The velocity of the output shaft 56 acting through the differential causes the first and second output shafts 36, 38 from the differential 18 to rotate at different speeds which is effective to turn the machine 10 about a predetermined turn radius. The microprocessor 50 compares the resulting turn radius, as detected by the third and fourth sensors 68, 70 to the desired turn radius required by the operator's input. If the resulting actual turn radius is not correct, the microprocessor 50 directs a signal to the control valve 66. The control valve 66 in turn directs pressurized fluid to the actuator 64 to adjust the position of the displacement adjustment mechanism 54 which in turn adjusts the torque to the output shaft 56. By adjusting the torque to and the speed of the output shaft 56, the turn radius is changed to match that required by the operator's input.

As previously set forth with respect to FIGS. 2, 3 and 4, the output torque from the steer motor 40 to the output shaft 56 is directly related to the displacement of the steer motor 40. Likewise, the output speed of the steer motor 40 is directly related to the steer radius and the speed of the output shaft 56 is directly related to the volume of fluid being directed across the steer motor 40. Therefore, when the torque needed to turn the output shaft 56 at the desired speed is low, the fluid flow required from the hydraulic pump 14 is also low. By keeping the flow requirements of the steer motor 40 as low as possible, it allows simultaneous operation of the work system 16 and the steer motor 40 without sacrificing overall system efficiency.

In the event of a pump or engine failure, the accumulator 84 provides pressurized fluid to the electrically actuated control valve 58 and the first and second proportional valves 78, 80 which permits emergency steering. The emergency steering is accomplished by the microprocessor 50 selectively controlling actuation of the second and third brakes 74, 76 in response to the desired steer input. In the event of emergency steering, the displacement of the steer motor 40 is moved to a zero displacement position.

As can be derived from a review of FIG. 4, as the turn radius approaches a pivot turn, the required speed of the output 56 from the steer motor 40 increases. In order to increase the speed of the shaft 56, the volume of flow being directed across the steer motor 40, for a given steer motor displacement, has to be increased. For a given pressure level in the system, an increase in the displacement of the steer motor 40 results in an increase in the torque output to the output shaft 56. As is well known, increasing the torque output from the steer motor requires additional horsepower from the engine 12 and also requires additional flow and/or pressure from the hydraulic pump 14.

If the machine is requiring either or both large amounts of horsepower and flow to the work system at the same time that it needs to negotiate a small or tight turn radius, the engine 12 may lug and/or the hydraulic pump 14 may reach its maximum flow capability. If there isn't sufficient flow and pressure to the steer motor 40 to provide the needed torque to turn the output shaft 56 at the needed speed, the machine 10 will not perform the desired turn radius. If the microprocessor 50 detects that the flow capacity of the hydraulic pump 14 is reaching its maximum flow capacity, the differential steer system 30 acts through the brake assisted steering to supplement the steering of the machine 10.

If the machine 10 is being steered to the left with a small turn radius and the microprocessor 50 detects that the hydraulic pump 14 is reaching its maximum flow capacity, the microprocessor 50 directs a signal to the control valve 78 which provides a braking force to the second brake 74 that is proportional to the signal from the microprocessor 50. The force being applied to the second brake 74 further retards the speed of the first output shaft 36 which effectively reduces the torque needed at the output shaft 56 to affect a desired turn radius. Steering to the right with a small turn radius would be accomplished in the same manner by the microprocessor 50 directing a signal to the second proportional valve 80 to proportionally apply the right brake 76.

The use of the respective second and third brakes 74, 76 to aid in steering is preferably limited to use during tight turns. This is based on the fact that it takes more horsepower to brake the output shaft 74/76 from the differential 18 during a more gradual turning radius. Since horsepower is equal to the speed of the element being braked times the torque, it is more beneficial to apply the braking effort when the speed of the output shaft 74/76 is turning at a slower rate. By using the brake assisted steering only during a tight turning radius, the overall system efficiency is improved while still providing the required steering capability. The use of brake assisted steering provides the opportunity to use a smaller steer motor 40 since the size of the steer motor 40 is directly proportional to the maximum required torque needed to drive the mechanism in the differential 18. By keeping the size of the steer motor 40 small, it also provides the opportunity to keep the main source of pressurized fluid 14 small.

In view of the above, it is readily apparent that the subject differential steer system 30 provides the needed steer capability at an improved system efficiency. The improved system efficiency is provided by using a variable displacement steer motor 40 that provides an output speed to the output shaft 56 that satisfies the steering needs without having to pass excess steering flow from the source of pressurized fluid to the reservoir. Additionally, by using brake assisted steering in combination with the steer motor 40, the hydraulic horsepower required in the system may be reduced and the size of one or both of the variable displacement steer motor 40 and the source of pressurized fluid 14 may be smaller in rated capacity.

Other aspects, objects and advantages of this invention can be obtained from a study of the drawings, the disclosure and the appended claims.

I claim:

1. A differential steer system adapted for use in a machine having an engine, a source of pressurized fluid connected to a work system, a differential disposed between first and second outputs, and a steer input mechanism, the differential steer system comprising:

a variable displacement steer motor having a displacement adjustment mechanism and being fluidity connected to the source of pressurized fluid, the steer motor has an output shaft connected to the differential and the displacement adjustment mechanism is movable in opposite directions from a zero displacement position towards a maximum displacement position;

a steer motor input control mechanism connected to the displacement adjustment mechanism of the steer motor and being operative in response to the steer input mechanism to control the displacement of the steer motor;

a first sensor associated with the steer input mechanism and operative to sense the direction and degree of rotation of the steer input mechanism;

a second sensor associated with the output shaft of the steer motor and operative to sense the direction of rotation and the speed of rotation of the steer motor output shaft; and a microprocessor operative to receive the sensed signals from the first and second sensors and deliver a control signal to the steer motor input control mechanism to change the displacement of the steer motor in response to the movement of the steer input mechanism.

2. The differential steer system of claim 1 including a brake directly connected to the steer motor output shaft.

3. The differential steer system of claim 2 wherein the brake is applied when both of the first and second outputs from the differential are turning in the same direction and at substantially the same rate.

4. The differential steer system of claim 3 wherein the brake is pressure applied.

5. The differential steer system of claim 4 wherein the steer motor input control mechanism includes a mechanical connection between the steer input mechanism and the steer motor displacement adjustment mechanism.

6. The differential steer system of claim 5 wherein the steer motor input control mechanism includes a hydraulic actuator disposed in the mechanism between the steer input mechanism and the steer motor displacement adjustment mechanism and operative in response to the microprocessor detecting an error between the desired output speed of the steer output shaft and the actual speed of the steer motor output shaft to adjust the position of the displacement adjustment mechanism to eliminate the error.

7. The differential steer system of claim 6 including an accumulator connected to the source of pressurized fluid through an electrically controlled accumulator charging valve.

8. The differential steer system of claim 7 including an electrically controlled directional valve disposed between the accumulator and the hydraulic actuator and operative to control movement of the hydraulic actuator in response to receipt of an electrical signal from the microprocessor.

9. The differential steer system of claim 4 including second and third brakes respectively connected to the first and second outputs from the differential and selectively operable to aid in the steering of the machine whenever the rotational speed of one of the first and second outputs from the differential is rotating in a speed range between approximately twenty percent of the rotational speed of the other one and zero.

10. The differential steer system of claim 9 wherein the source of pressurized fluid has a maximum available flow rate and the respective ones of the second and third brakes is selectively applied in response to the flow from the source of pressurized fluid generally reaching its maximum available flow rate.

11. The differential steer system of claim 10 wherein an input torque to the differential is required to provide a differential speed between the first and second outputs of the differential and an output torque is produced by the steer motor that is generally proportional to the displacement of the steer motor, the respective one of the second and third brakes is selectively applied when the torque level required by the differential generally equals or exceeds the torque produced by the steer motor.

12. The differential steer system of claim 11 wherein first and second solenoid operated valves are positioned between the source of pressurized fluid and the respective second and third brake and the microprocessor provides a signal to the appropriate one of the first and second solenoid operated valves to proportionally apply the second or third brake.

13. The differential steer system of claim 12 wherein the first and second solenoid operated valves are connected to the accumulator downstream of the accumulator charging valve.

* * * * *